United States Patent
Matsumura

(10) Patent No.: US 10,769,536 B2
(45) Date of Patent: Sep. 8, 2020

(54) WORK SUPPORT SYSTEM AND WORK SUPPORT PROGRAM

(71) Applicant: GRACE TECHNOLOGY, INC., Tokyo (JP)

(72) Inventor: Yukiharu Matsumura, Tokyo (JP)

(73) Assignee: GRACE TECHNOLOGY, INC., Tokyo (JP)

( * ) Notice: Subject to any disclaimer, the term of this patent is extended or adjusted under 35 U.S.C. 154(b) by 102 days.

(21) Appl. No.: 16/312,385

(22) PCT Filed: Nov. 5, 2018

(86) PCT No.: PCT/JP2018/040989
§ 371 (c)(1),
(2) Date: Dec. 21, 2018

(87) PCT Pub. No.: WO2019/123861
PCT Pub. Date: Jun. 27, 2019

(65) Prior Publication Data
US 2019/0362243 A1  Nov. 28, 2019

(30) Foreign Application Priority Data
Dec. 20, 2017  (JP) ................. 2017-243950

(51) Int. Cl.
*G06N 5/02* (2006.01)
*G06N 20/00* (2019.01)
(Continued)

(52) U.S. Cl.
CPC ............. *G06N 5/02* (2013.01); *G06F 1/163* (2013.01); *G06F 9/542* (2013.01); *G06K 9/62* (2013.01); *G06N 20/00* (2019.01); *G06N 5/04* (2013.01)

(58) Field of Classification Search
None
See application file for complete search history.

(56) References Cited

FOREIGN PATENT DOCUMENTS

| JP | 2004101372 A | 4/2004 |
|---|---|---|
| JP | 2016015026 A | 1/2016 |
| JP | 2017191351 A | 10/2017 |

OTHER PUBLICATIONS

Ei-Diraby, et al., A Semantic Framework to Support Corporate Memory Management in Building Construction, Automation in Construction 15, 2006, pp. 504-521 (Year: 2006).*

(Continued)

*Primary Examiner* — Wilbert L Starks
(74) *Attorney, Agent, or Firm* — Rankin, Hill & Clark LLP

(57) ABSTRACT

A work support system that is suitable for dealing with a wide variety of work is provided.

An AI manual system 100 extracts terms from a manual describing procedures, contents, points of attention, or other matters of work, based on a term table in which one or multiple terms are registered, and generates a rule describing a determination condition of a work object or work situation by using the extracted terms as elements. Furthermore, sensor information is acquired from the device 300, and the work object and the work situation that are associated with the terms that are the elements of the determination condition are recognized based on the acquired sensor information. Based on the rule and a recognition result, work support information is transmitted to the device 300.

6 Claims, 8 Drawing Sheets

(51) Int. Cl.
G06F 1/16 (2006.01)
G06F 9/54 (2006.01)
G06K 9/62 (2006.01)
G06N 5/04 (2006.01)

(56) References Cited

OTHER PUBLICATIONS

Japanese Office Action dated Feb. 28, 2018 for the corresponding Japanese Patent Application No. 2017-243950.
Decision to Grant dated Mar. 28, 2018 for the corresponding Japanese Patent Application No. 2017-243950.
International Search Report and Written Opinion of the International Searching Authority dated Nov. 27, 2018 filed in PCT/JP2018/040989.

* cited by examiner

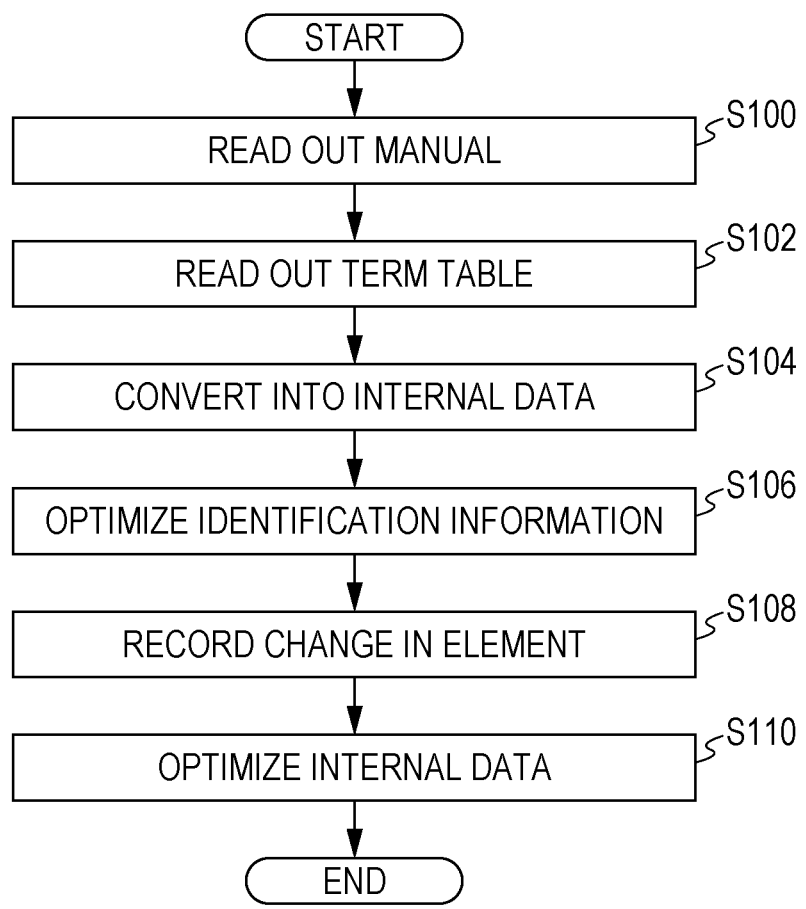

*FIG. 7*

■ RULE SET—EXAMPLE 1: HEADING 1 (WORKER HIMSELF/HERSELF)

RULE EXAMPLE 1-1 (EXPANSION OF EXPLANATORY TEXT)
if [BODY TEMPERATURE] IS [ABNORMAL] then [NOTIFY] [MANAGER] OF [ABNORMALITY] OF "WORKER' BODY"

RULE EXAMPLE 1-2 (EXPANSION OF EXPLANATORY TEXT)
if [POSITION] IS [IN THE SURROUNDING] OF [OBJECT EQUIPMENT] then
RULE SET – EXAMPLE 2: WORK PREPARATION
.
.
.

■ RULE SET—EXAMPLE 2: HEADING 2 (WORK PREPARATION)

RULE EXAMPLE 2-1
if not [WORKER] [WEAR] [GLOVES] then [INSTRUCT] [WORKER] TO [WEAR] [GLOVES]
.
.

■ RULE SET—EXAMPLE N: HEADING N (EXCHANGE WORK—AFTER REMOVING OLD COMPONENT, INSTALL NEW COMPONENT)

RULE EXAMPLE N-1
if [DESIGNATED POSITION] OF [OBJECT EQUIPMENT] IS [VACANT]
then CONTINUE WORK
else [ISSUE] [WARNING-1] TO [WORKER]

RULE EXAMPLE N-2
if [WORKER] [HOLDS] [COMPONENT A] IN [HIS/HER HAND] and [COMPONENT A] MATCHES [IMAGE-1]
then CONFIRM [ORIENTATION OF COMPONENT A].
.
.

■ RULE SET—EXAMPLE M: HEADING N (ORIENTATION OF COMPONENT A)
RULE EXAMPLE M-1
if [COMPONENT A] IS [IN THE DESIGNATED ORIENTATION] then ADVANCE TO [INSERTION WORK] OF [COMPONENT A]
.
.

■ DECISION TABLE (PROCESS ORDER AND WORK EVALUATION)
(OMIT)
■ STATE TABLE (STATE TRANSITION OF SITUATION OR OBJECT)
(OMIT)

WORK SUPPORT SYSTEM AND WORK SUPPORT PROGRAM

TECHNICAL FIELD

The present invention relates to a system and a program for supporting work of a worker, and particularly relates to a work support system and a work support program that are suitable for dealing with a wide variety of work.

BACKGROUND ART

Conventionally, for example, a work support device described in Patent Literature 1 has been known as a technique for supporting work.

The technique described in Patent Literature 1 is a wearable computer to be worn by a worker who works in a radiation controlled area. The wearable computer comprises: a function database that associates operation contents input to an input device with work procedures; an operation content collection section that collects, from the input device, an input operation content that is input by the worker among the operation contents; and a work content output section that outputs, to an output device, an output work procedure that is associated with the input operation content among the work procedures by referring to the function database. The output device notifies the worker of the output work procedure.

CITATION LIST

Patent Literature

PATENT LITERATURE 1: Japanese Unexamined Patent Publication No. 2004-101372

SUMMARY OF THE INVENTION

Technical Problem

However, in the technique described in Patent Literature 1, operation contents need to be defined one by one in advance, and work procedures associated with the operation contents need to be created one by one. Thus, the technique had a problem in that there is a difficulty in dealing with a wide variety of work.

Therefore, the present invention is made by focusing on such an unsolved problem of conventional techniques, and an object thereof is to provide a work support system and a work support program that are suitable for dealing with a wide variety of work.

Solution to the Problem

[Invention 1] In order to achieve the above-described objective, the work support system of Invention 1 is a work support system that is communicably connected to a device having a sensor and a notification means that is worn or carried by a worker, for supporting work of the above-described worker, comprising: a rule generation means that generates a rule describing a determination condition of a work object or work situation based on a manual describing procedures, contents, points of attention, or other matters of the work; a sensor information acquisition means that acquires sensor information of the above-described sensor; a recognition means that recognizes the above-described work object and the above-described work situation based on the sensor information acquired by the above-described sensor information acquisition means; and a work support information output means that outputs work support information to the above-described notification means based on the rule generated by the above-described rule generation means and a recognition result of the above-described recognition means.

According to such a configuration, the rule is generated based on the manual by the rule generation means. In addition, the sensor information of the sensor is acquired by the sensor information acquisition means, and the work object and the work situation are recognized based on this sensor information by the recognition means. Furthermore, the work support information is output to the notification means based on the rule and the recognition result by the work support information output means.

In this regard, the sensor information acquisition means may, for example, obtain or receive the sensor information from the device, other terminals, or the like, while the sensor information may be input from an input device or the like, or the sensor information may be read out from a storage device, a storage medium, or the like. Accordingly, the acquisition includes at least input, obtainment, reception, and readout (including search). Hereinafter, the concept of the acquisition will be the same.

In addition, the present system may be realized as a single device, terminal or other equipment, or may be realized as a network system to which multiple devices, terminals, or other pieces of equipment are communicably connected. In the case of the latter, respective constituent elements may belong to any of the multiple pieces of equipment and the like as long as they are communicably connected with one another.

[Invention 2] Furthermore, the work support system of Invention 2 is the work support system of Invention 1, wherein the above-described rule generation means extracts terms from the above-described manual based on a term table in which terms are registered, and generates a rule describing the above-described determination condition having the extracted terms as elements, and the above-described recognition means recognizes the above-described work object and the above-described work situation associated with the terms to become the above-described elements in the above-described determination condition.

According to such a configuration, the rule generation means extracts the terms from the manual based on the term table, and generates the rule describing the determination condition having those terms as the elements. Furthermore, the recognition means recognizes the work object and the work situation associated with the terms to become the elements in the determination condition.

[Invention 3] Furthermore, the work support system of Invention 3 is the work support system of either Invention 1 or Invention 2, wherein the above-described rule generation means generates the above-described rule by associating elements that are terms, headings, texts, items, charts, figures, images, videos, or others included in the above-described manual, and the work support system comprises an element change recording means that records changes in the above-described elements using a model case, and a learning means that optimizes the above-described rule such that the above-described model case gains the highest evaluation based on a recording result of the above-described element change recording means.

According to such a configuration, the rule generation means generates the rule by associating the elements that are the terms, headings, texts, items, charts, figures, images, videos, or others included in the manual. Furthermore, the element change recording means records the changes in the elements using the model case, and the learning means optimizes the rule such that the model case gains the highest evaluation based on this recording result.

[Invention 4] Furthermore, the work support system of Invention 4 is the work support system of Invention 3, wherein the above-described work support information output means outputs the above-described work support information to the above-described notification means when the work object or the work situation recognized by the above-described recognition means is determined to satisfy the determination condition of the above-described rule, and the work support system comprises a rule change recording means that records changes in the above-described rule, and an evaluation information generation means that generates evaluation information on a work result using differences as compared to the rule optimized by the above-described learning means based on a recording result of the above-described rule change recording means.

According to such a configuration, the work support information output means outputs the work support information when the recognized work object or work situation is determined to satisfy the determination condition of the rule. Furthermore, the rule change recording means records the changes in the rule, and the evaluation information generation means generates the evaluation information using the differences as compared to the optimized rule based on this recording result.

[Invention 5] Furthermore, the work support system of Invention 5 is the work support system of either Invention 3 or Invention 4, comprising: a virtuality reproduction means that virtually reproduces the above-described work object and the above-described work situation that have changed due to an act of the above-described worker according to the rule generated by the above-described rule generation means; an optimization object selection means that presents differences from the highest evaluation for respective points of the changes reproduced by the above-described virtuality reproduction means, and that selects, for each of constituting units or each of the above-described points of changes, whether to set this as an optimization object; and a second learning means that optimizes the above-described rule with the optimization object selected by the above-described optimization object selection means.

According to such a configuration, the virtuality reproduction means virtually reproduces the work object and the work situation that have changed due to the act of the worker according to the generated rule, and the optimization object selection means presents the differences from the highest evaluation for the respective points of changes, and selects, for each of the constituting units or each of the points of changes, whether to set this as the optimization object. Furthermore, the second learning means optimizes the rule with the selected optimization object.

[Invention 6] Furthermore, the work support system of Invention 6 is the work support system of Invention 5, comprising: a manual revision means that generates or revises the above-described manual based on the rule optimized by the above-described learning means or the above-described second learning means; a new element confirmation means that confirms inclusion of the above-described elements that are new and presence of differences, based on the manual that was generated or revised by the above-described manual revision means; a relevant element presenting means that presents relevant constituting units or points of changes as insufficient parts, based on a confirmation result of the above-described new element confirmation means; a rule recording means that records the above-described rule based on a work result concerning the above-described insufficient parts; a second virtuality reproduction means that virtually reproduces the above-described work object and the above-described work situation that have changed due to an act of the above-described worker according to the rule recorded by the above-described rule recording means; a second optimization object selection means that presents differences from the highest evaluation for respective points of the changes reproduced by the above-described second virtuality reproduction means, and that selects, for each of the above-described constituting units or each of the above-described points of changes concerning the above-described insufficient parts, whether to set this as an optimization object; and a third learning means that optimizes the above-described rule with the optimization object selected by the above-described second optimization object selection means.

According to such a configuration, the manual revision means generates or revises the manual based on the optimized rule, and the new element confirmation means confirms the inclusion of new elements and the presence of differences based on this manual. Further, the relevant element presenting means presents the relevant constituting units or points of changes as the insufficient parts based on this confirmation result. Next, the rule recording means records the rule based on the work result concerning the insufficient parts, and the second virtuality reproduction means virtually reproduces the work object and the work situation that have changed due to the act of the worker according to the recorded rule. Furthermore, the second optimization object selection means presents the differences from the highest evaluation for the respective points of change, and selects, for each of the constituting units or each of the points of changes concerning the insufficient parts, whether to set this as the optimization object. Moreover, the third learning means optimizes the rule with the selected optimization object.

[Invention 7] Meanwhile, in order to achieve the above-described objective, the work support program of Invention 7 is a work support program to be executed by a computer that is communicably connected to a device having a sensor and a notification means that is worn or carried by a worker, for supporting work of the worker, wherein the program is for allowing the above-described computer to execute processing comprising: a rule generation step that generates a rule describing a determination condition of a work object or work situation based on a manual describing procedures, contents, points of attention, or other matters of the work; a sensor information acquisition step that acquires sensor information of the above-described sensor; a recognition step that recognizes the above-described work object and the above-described work situation based on the sensor information acquired in the above-described sensor information acquisition step; and a work support information output step that outputs work support information to the above-described notification means based on the rule generated in the above-described rule generation step and a recognition result in the above-described recognition step.

According to such a configuration, the program is read out by the computer, and the computer executes the processing according to the readout program, thereby obtaining working effects that are equivalent to those of the work support system of Invention 1.

Advantages of the Invention

As has been described above, according to the work support system of Invention 1 or the work support program of Invention 7, the rule is generated based on the manual, and the work support information is notified based on the rule and the recognition result of the work object and the work situation. Thus, for example, if an existing manual such as a maintenance manual is given, the work support information in accordance with the work object and the work situation can be provided to the worker. Accordingly, since there is no need to define work contents and create work procedures one by one, it is possible to easily deal with a wide variety of work as compared to conventional techniques.

Furthermore, according to the work support system of Invention 2, the generation of the rule, the recognition of the work object and the work situation, and the application to the rule are performed by having the terms as the elements, and thus it is possible to improve conformity to the rule.

Furthermore, according to the work support system of Invention 3, the rule is optimized such that the model case gains the highest evaluation, and thus it is possible to improve conformity to the rule.

Furthermore, according to the work support system of Invention 4, it is possible to obtain evaluation information that uses the model case as the standard.

Furthermore, according to the work support system of Invention 5, the rule is optimized in accordance with the actual work content of the worker, and thus it is possible to improve conformity to the rule.

Furthermore, according to the work support system of Invention 6, the insufficient parts are analyzed based on the generated or revised manual, and the rule is optimized based on this analysis result. Thus, it is possible to improve conformity to the rule.

BRIEF DESCRIPTION OF THE DRAWINGS

FIG. 6 is a flow chart illustrating initial processing.

FIG. 7 is a figure illustrating a configuration example of a rule.

DESCRIPTION OF EMBODIMENTS

Hereinafter, an embodiment of the present invention will be described. FIG. 1 to FIG. 10 are figures illustrating the present embodiment.

Firstly, an outline of the present embodiment will be explained.

Figure 1:
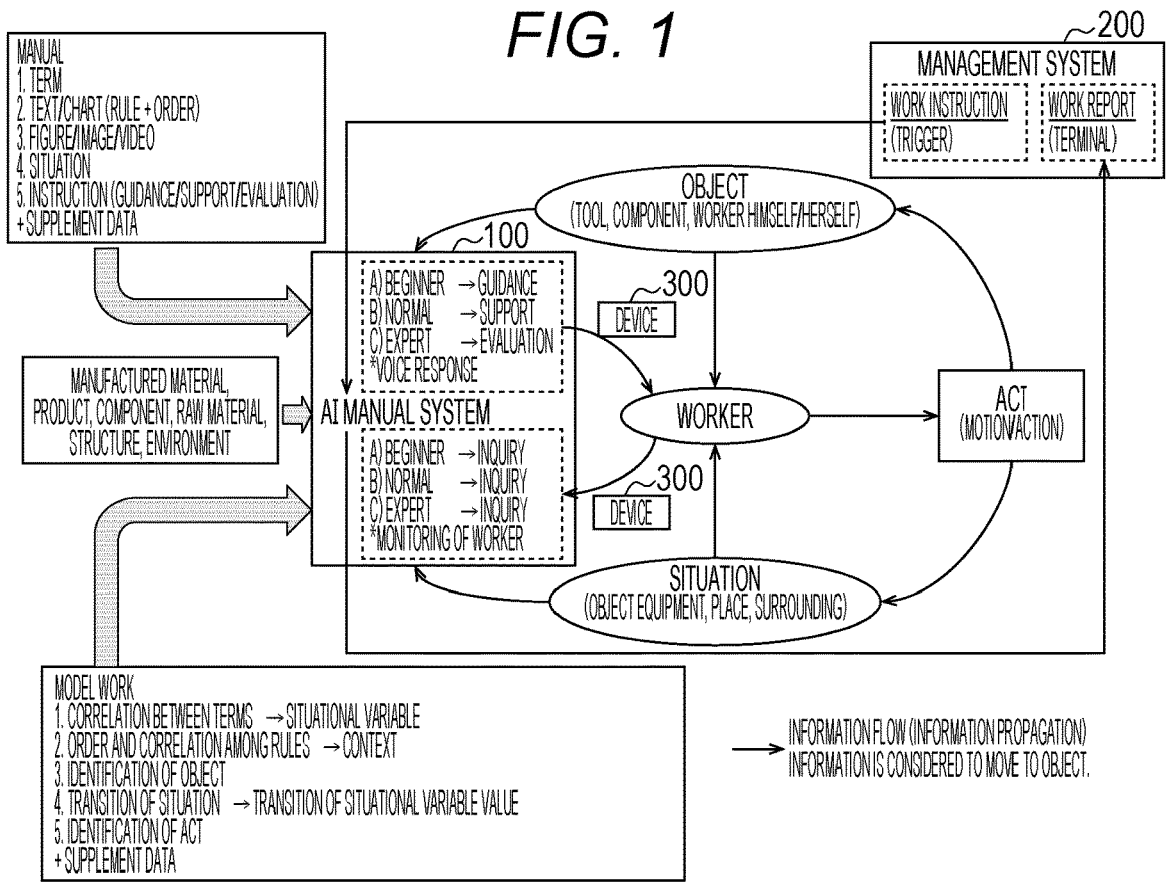
FIG. 1 is a figure for explaining an outline of the present embodiment.

FIG. 1 is a figure for explaining an outline of the present embodiment.

In the present embodiment, when a worker performs maintenance of equipment, facilities, and the like, the worker is provided with work support information indicating procedures, contents, points of attention, or other matters of work such that the work is supported. The worker wears a device 300 upon starting the work. Once a management system 200 transmits a work instruction to an AI manual system 100 as a trigger, the AI manual system 100 starts provision of the work support information to the worker through the device 300. Upon completion of the work, the AI manual system 100 creates a report of the work, and transmits the report to the management system 200.

The AI manual system 100 generates a rule describing a determination condition of a work object or a work situation (hereinafter, simply referred to as the "rule") based on a manual describing procedures, contents, points of attention, or other matters of the work, information related to manufactured materials, products, components, raw materials, structures, and environments, and model work information related to model work. Furthermore, the AI manual system 100 acquires sensor information from the device 300, recognizes the work object and the work situation based on the acquired sensor information, and when the recognized work object or work situation is determined to satisfy the determination condition of the rule, notifies the work support information through the device 300. In this manner, (1) recognition by an input from the device 300 and (2) provision of information by an output to the device 300, are repeated until the worker completes the work.

In this regard, the work object refers to a thing to which a change is caused by an act of a worker. For example, (1) a worker himself/herself (for example, a worker when the worker moves a place), (2) a component (for example, a component when a worker takes out the component), (3) gloves (for example, gloves when a worker wears the gloves), (4) a tool (for example, a tool when a worker operates the tool in order to exchange a component), (5) equipment (for example, equipment when a worker exchanges a component of the equipment), (6) a grease (for example, a grease when a worker injects the grease into equipment using a tool), (7) a screen display (for example, a screen display when a worker operates equipment), and (8) a lamp (for example, a lamp when a worker operates equipment), fall under the work object.

In addition, the work situation refers to a surrounding of an object that passively changes due to an act of a worker, or a thing other than the "object" that is affected by the change in the "object". For example, (1) equipment itself in which a component is to be installed, (2) the position of equipment or a component as an object of an act, (3) the temperature, humidity, and sound in the surrounding of an object of an act, (4) the pulse, body temperature, and blood pressure of a worker himself/herself, (5) the position of a worker himself/herself, (6) lighting and extinguishing of a lamp, and (7) ringing of warning sound, fall under the work situation.

The AI manual system 100 classifies workers into three levels, e.g., "beginner", "normal", and "expert". The AI manual system 100 performs guidance on workers who are beginners, support on workers who are normal and more professional than the beginners, and evaluation on workers who are experts and more professional than those who are normal.

Figure 2:
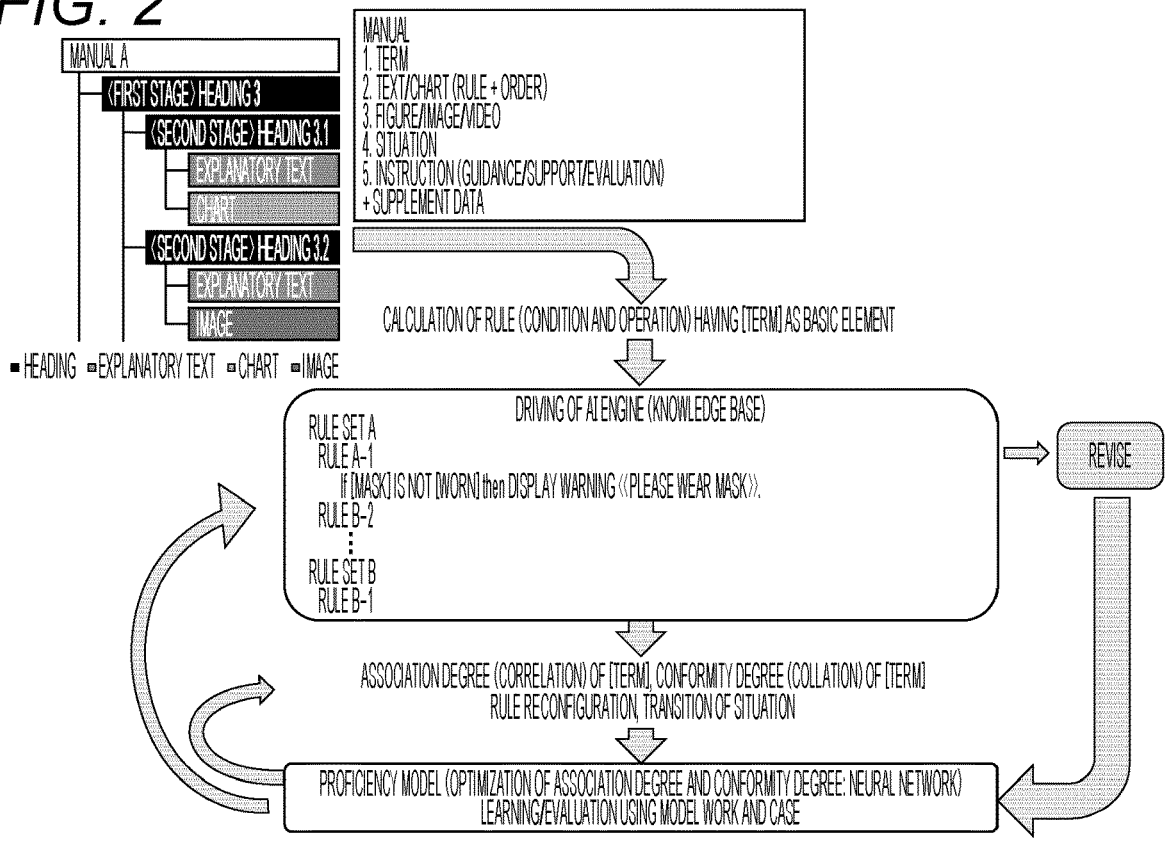
FIG. 2 is a figure for explaining a configuration of a rule having terms as elements.

FIG. 2 is a figure for explaining a configuration of a rule having terms as elements.

As illustrated in FIG. 2, the AI manual system 100 generates a rule by associating elements that are terms, headings, texts, items, charts, figures, images, videos, or others included in a manual, and records the generated rule as a knowledge base. The knowledge base will become basic information for driving an AI engine. In addition, the rule describes a determination condition having terms as elements, and the rule is optimized upon learning of a work content of a worker by an artificial intelligence (AI).

Next, a configuration of the present embodiment will be explained.

Figure 3:
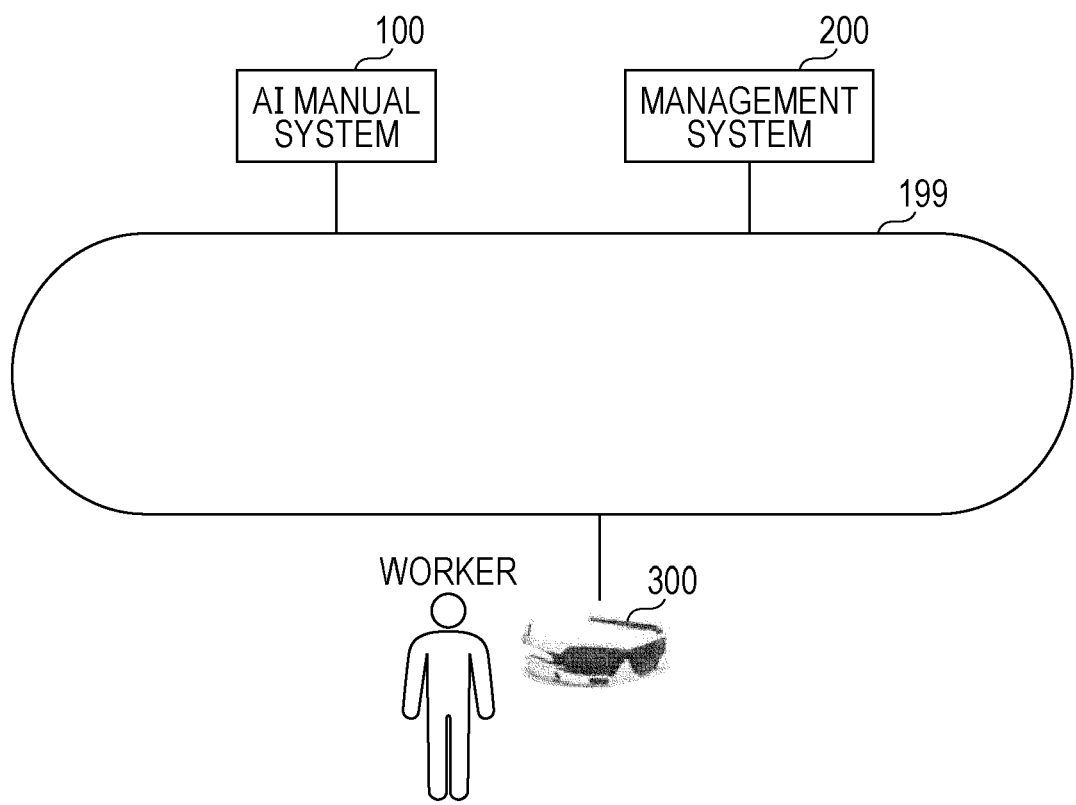
FIG. 3 is a block diagram illustrating a configuration of a network system related to the present embodiment.

FIG. 3 is a block diagram illustrating a configuration of a network system according to the present embodiment.

As illustrated in FIG. 3, the AI manual system 100, the management system 200, and the device 300 are connected by Internet 199. The device 300 is connected to the Internet 199 by a wireless communication through a radio repeater (not illustrated).

Next, a configuration of the device 300 will be explained.

Figure 4:
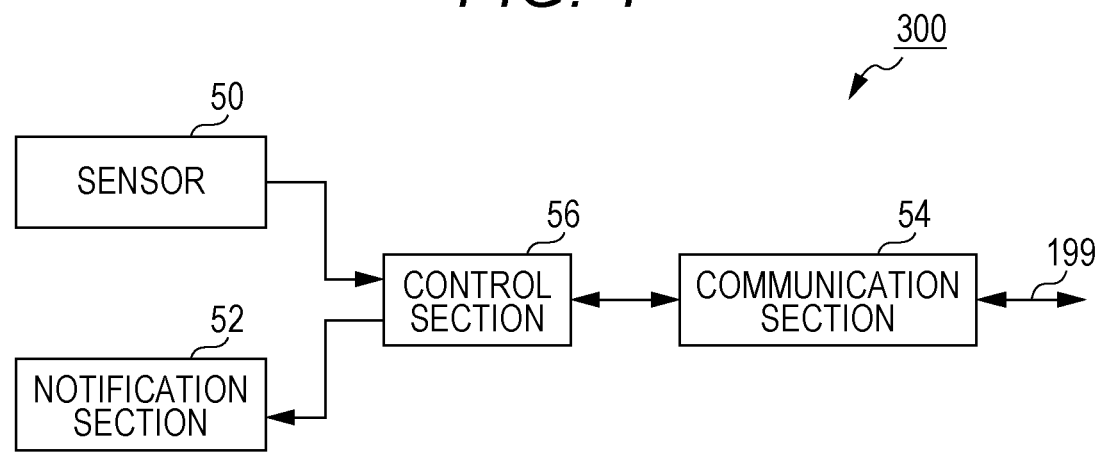
FIG. 4 is a functional block diagram of a device 300.

FIG. 4 is a functional block diagram of the device 300.

The device 300 is made of a smart glass or the like, and as illustrated in FIG. 4, the device 300 has a sensor 50, a notification section 52, a communication section 54, and a control section 56. For example, when the device 300 is composed of a smart glass, work support information (images, figures, messages, etc.) can be displayed in a semi-transmissive manner (superimposed or overlaid) within the visual field of the worker.

The sensor 50 has an image sensor such as a camera, and when a worker wears the device 300, detects an image seen from a viewpoint of the worker as sensor information. In addition, the sensor 50 has a sound collection sensor such as a microphone, and detects a voice of the worker or other sounds in the surrounding as sensor information. In addition, the sensor 50 has a biosensor such as a pulse sensor, and detects bio-information such as the pupil, pulse, body temperature, and blood pressure of the worker as sensor information. In addition, the sensor 50 has an acceleration sensor or posture sensor, and detects body motions such as the position, orientation, and acceleration of the worker as sensor information. In addition, the sensor 50 has an environment sensor such as a temperature sensor, and detects environment information such as the temperature, humidity, electromagnetic force, and smell in the surrounding of the worker as sensor information. Furthermore, the sensor 50 outputs these detected pieces of sensor information to the control section 56.

The notification section 52 has a display part such as a display, a voice output part such as a speaker, and a vibrating part such as a vibrator, and notifies the work support information by display, voice, or vibration in accordance with control by the control section 56.

The communication section 54 performs data communication according to the standard of wireless communication, and requests transmission of information to a server or the like through the Internet 199. Furthermore, the communication section 54 receives information that is transmitted from the server or the like, and outputs the information to the control section 56.

The control section 56 is composed by bus-connecting a CPU, an ROM, an RAM, and the like.

Next, a configuration of the AI manual system 100 will be explained.

Figure 5:
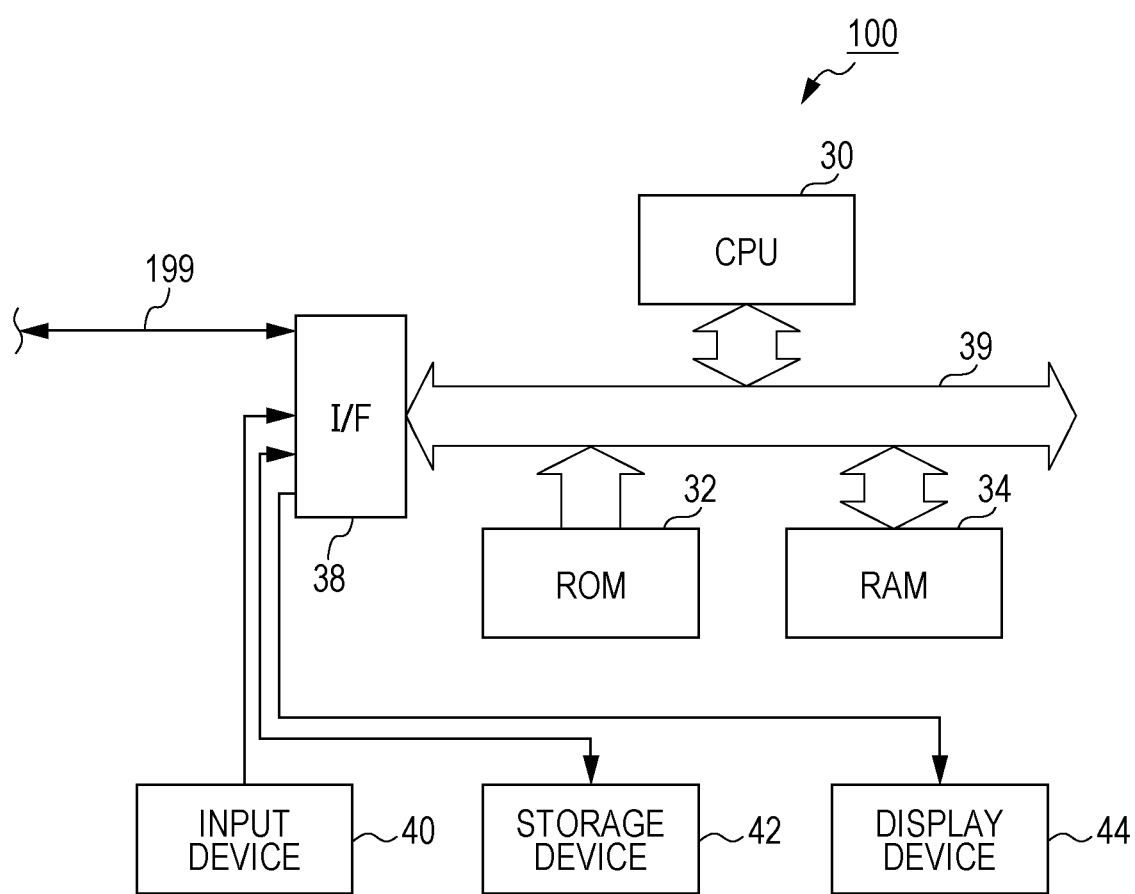
FIG. 5 is a figure illustrating a hardware configuration of an AI manual system 100.

FIG. 5 is a figure illustrating a hardware configuration of the AI manual system 100.

As illustrated in FIG. 5, the AI manual system 100 is composed of a central processing unit (CPU) 30 that controls arithmetic calculation and an entire system based on a control program, a read only memory (ROM) 32 that stores the control program or the like of the CPU30 in a prescribed region in advance, a random access memory (RAM) 34 that stores data read out from the ROM 32 or the like and the result of arithmetic calculation that is necessary in the process of arithmetic calculation of the CPU 30, and an interface (I/F) 38 that mediates input and output of data to an external device, and these are mutually connected in a manner capable of transferring data by a bus 39 that is a signal line for transferring data.

The I/F 38 is connected to an input device 40 consisting of a keyboard, a mouse, and the like that are capable of inputting data as human interfaces, a storage device 42 that stores data, table, and the like as files, a display device 44 that displays a screen based on an image signal, and a signal line for connection to the Internet 199, as external devices.

Next, a data structure of the storage device 42 will be explained.

The storage device 42 stores a manual and a term table. The manual is, for example, an existing manual such as a maintenance manual, and the manual includes elements that are terms, headings, texts, items, charts, figures, images, videos, or others. One or multiple terms are registered in the term table.

In addition, the storage device 42 stores internal data of the AI engine (hereinafter, simply referred to as the "internal data"). The internal data includes a knowledge base, term conformity degree information, condition association degree information, constitution association degree information, object identification information, situation identification information, an inquiry response module, a guidance instruction module, an evaluation learning module, a reconfiguration module, and a multi-language module.

The knowledge base is basic information for driving the AI engine, that is generated from the manual. The basic information is an aggregation of rules composed of a condition part and an action part. Behavior of the AI engine is controlled per constituent (work item) unit.

The term conformity degree information is information for determining conformity to a term (this is different from term identification information, which is for identifying a term). For example, conformity to a term [close] includes a change in an object before and after an act of a worker.

The condition association degree information is information on the strength of association among the object, the situation, and the condition of work described in the manual. For example, in the case of an essential condition, the strength of association with the instruction is "1". Regarding the object, the situation, and the condition of work that completely have no association, the strength of association is "0".

The constitution association degree information is information on the strength of association among constituting units described in the manual. For example, the association among constituting units in which the order of work is predetermined is "1", while the association degree among items that are in random order is "0".

The object identification information is identification information for identifying a work object when determining conformity to a term. For example, in the case of a term [component A], this information is used to identify the component A, and also identify the orientation and position of the component A.

The situation identification information is identification information for identifying a work situation when determining conformity to a term. For example, a situation A is indicated by multiple terms or a combination of values of those terms. A rule itself to be applied will be selected.

The inquiry response module is information and processing for responding to an inquiry from a worker. A response will be made to the inquiry from the worker.

The guidance instruction module is information and processing for guiding a worker with texts, voices, videos, or vibrations. A text, voice, video, or vibration that is associated with the term will be presented to the worker.

The evaluation learning module records a transition in values of conformity degree or association degree caused by work, and performs comparison and evaluation with respect to a model work. In addition, internal data will be optimized using this record as a model case.

The reconfiguration module configures a manual from internal data. For example, the reconfiguration module reconfigures and outputs the internal data as the manual, and after revision, captures differences into the internal data.

The multi-language module is information and processing for associating a term to a language other than Japanese. For example, the multi-language module makes a conversion into a native language of a worker when performing inquiry and response or giving guidance instruction to the worker.

Next, operations in the present embodiment will be explained.

Firstly, operations in the case of executing initial processing with the AI manual system 100 will be explained.

FIG. 6 is a flow chart illustrating initial processing.

The CPU 30 consists of a micro-processing unit (MPU) and the like. The CPU 30 activates a prescribed program stored in the storage device 42, and executes the initial processing illustrated in the flow chart of FIG. 6 according to that program.

The initial processing is processing that is executed when configuring the AI engine. When the initial processing is executed in the CPU 30, firstly, a shift is made to Step S100 as illustrated in FIG. 6.

In Step S100, a manual is read out from the storage device 42, and a shift is made to Step S102 in which a term table is read out from the storage device 42. Then, a shift is made to Step S104.

In Step S104, terms are extracted from the manual based on the term table that was read out, and elements that are terms, headings, texts, items, charts, figures, images, videos, or others included in the manual are associated to generate a rule, followed by conversion into internal data, based on condition association degree information, constitution association degree information, and the like.

FIG. 7 is a figure illustrating a configuration example of a rule.

The rule describes a determination condition having the extracted terms as elements, and processing to be executed when a work object or a work situation satisfies this determination condition.

In the example of FIG. 7, the rule, "if [body temperature] is [abnormal] then [notify] [manager] of [abnormality] of 'worker's body'", means that when the body temperature of the worker is determined to be abnormal based on the sensor information of the device 300, processing of notifying the manager of the abnormality in the worker's body will be executed. In this regard, the terms in [ ] in the rule are the terms that were registered in the term table and extracted from the manual.

In addition, the rule, "if not [worker] [wear] [gloves] then [instruct] [worker] to [wear] [gloves]", means that when the worker is determined to be not wearing gloves based on the sensor information of the device 300, processing of transmitting work support information for instructing the worker to wear gloves to the device 300 will be executed.

Next, a shift is made to Step S106 in which term identification information, object identification information, and situation identification information are optimized using supplement data (information and the like from other systems). Then, a shift is made to Step S108 in which changes in the elements according to a model case are recorded as internal data, and a shift is made to Step S110.

In Step S110, the internal data (rule) is optimized such that the model case gains the highest evaluation based on this recording result. Specifically, machine learning is performed with input of multiple model cases, and optimization learning is performed based on the relationships among the learned cases. Upon completion of the processing in Step S110, the series of processing are completed.

Next, operations in the case of executing work support processing with the AI manual system 100 will be explained.

Figure 8:
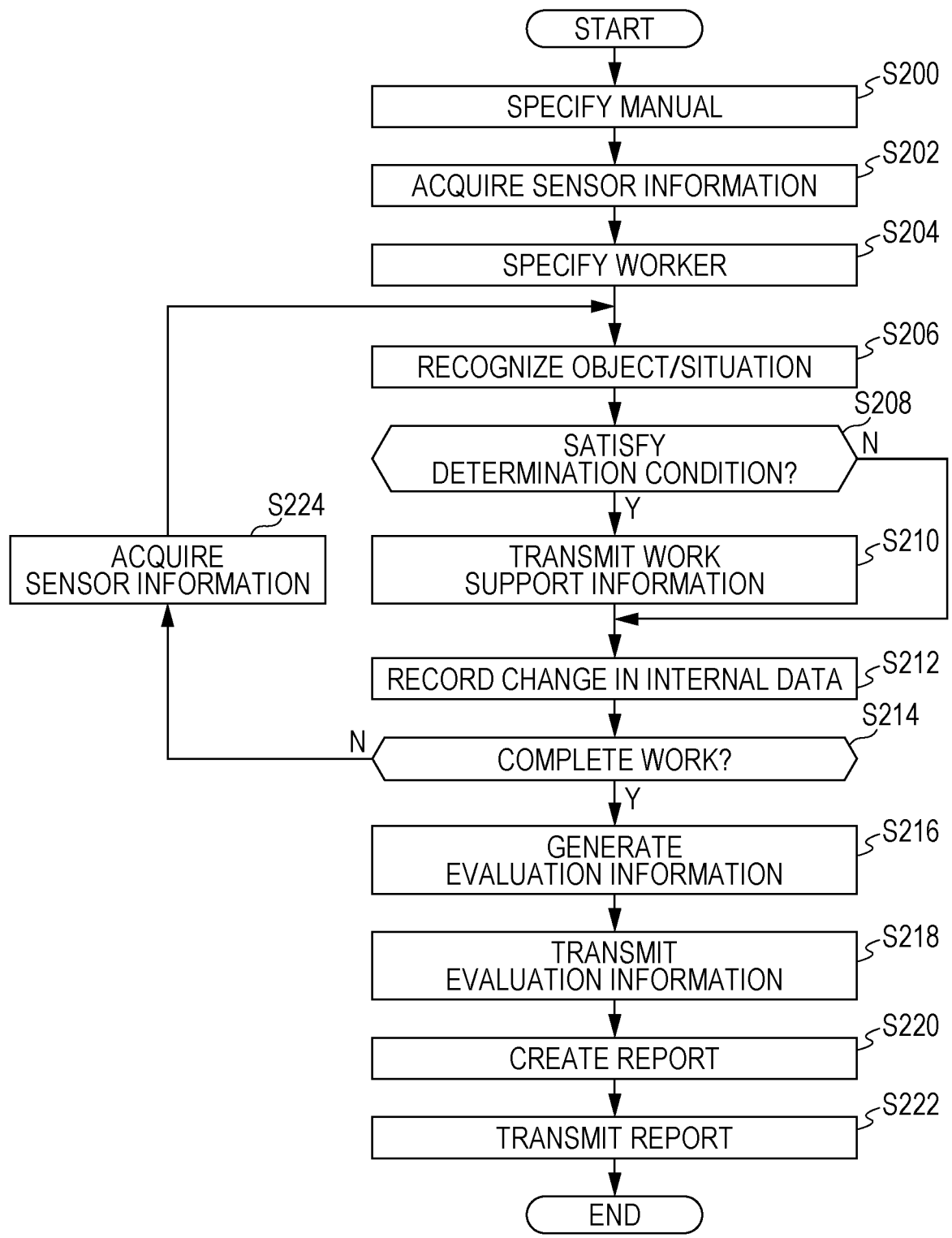
FIG. 8 is a flow chart illustrating work support processing.

FIG. 8 is a flow chart illustrating work support processing.

The CPU 30 activates a prescribed program (guidance instruction module) stored in the storage device 42, and executes the work support processing illustrated in the flow chart of FIG. 8 according to that program.

The work support processing is processing to be executed when a worker performs work. When the work support processing is executed in the CPU 30, firstly, a shift is made to Step S200 as illustrated in FIG. 8.

In Step S200, a manual related to the work performed by the worker is specified, and a shift is made to Step S202 in which sensor information is acquired from the device 300. Then, a shift is made to Step S204 in which the worker is specified based on the acquired sensor information, and a shift is made to Step S206.

In Step S206, a work object and a work situation that are associated with the terms in the determination condition of the rule are recognized based on the sensor information acquired in Steps S204 and S224, object identification information, situation identification information, term conformity degree information, and the like, and a shift is made to Step S208.

In Step S208, whether the work object and the work situation that were recognized in Step S206 satisfy the determination condition of the rule is determined. When it is determined that the determination condition is satisfied (YES), a shift is made to Step S210 in which processing of transmitting the work support information to the device 300 and other kinds of processing described in the determination condition are executed, and a shift is made to Step S212.

In Step S212, changes in the internal data (rule) are recorded. Then, a shift is made to Step S214 in which determination is made as to whether the work has completed, and when it is determined that the work has completed (YES), a shift is made to Step S216.

In Step S216, evaluation information on a work result is generated using differences as compared to the optimized internal data (rule), based on the recording result in Step S212. Then, a shift is made to Step S218 in which the generated evaluation information is transmitted to the device 300, and a shift is made to Step S220.

In Step S220, a report on the work is created by inserting the evaluation information generated in Step S216 into a template of the report. Then, a shift is made to Step S222 in which the created report is transmitted to the management system 200, and the series of processing are completed.

On the other hand, when it is determined that the work has not been completed (NO) in Step S214, a shift is made to Step S224 to acquire sensor information from the device 300, and then a shift is made to Step S204.

On the other hand, when it is determined that the determination condition has not been satisfied (NO) in Step S208, a shift is made to Step S212.

Next, operations in the case of executing proficiency processing with the AI manual system 100 will be explained.

Figure 9:
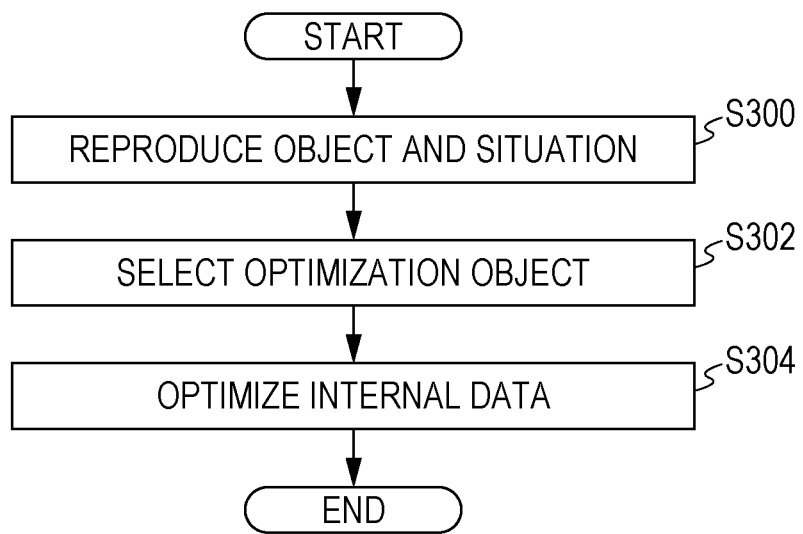
FIG. 9 is a flow chart illustrating proficiency processing.

FIG. 9 is a flow chart illustrating proficiency processing.

The CPU 30 activates a prescribed program (evaluation learning module) stored in the storage device 42, and executes the proficiency processing illustrated in the flow chart of FIG. 9 according to that program.

The proficiency processing is processing to be executed when learning a work content of a worker. When the proficiency processing is executed in the CPU 30, firstly, a shift is made to Step S300 as illustrated in FIG. 9.

In Step S300, the work object and the work situation that have changed due to an act of the worker are virtually reproduced according to the internal data (rule), and a shift is made to Step S302 in which differences from the highest evaluation for respective points of the reproduced changes are displayed on the display device 44, and an operator or the like is allowed to select, for each of constituting units or each of the points of changes, whether to set this as an optimization object. Then, a shift is made to Step S304.

In Step S304, the internal data (rule) is optimized with the selected optimization object. Specifically, machine learning is performed with input of work cases in the past, and optimization learning is performed based on the relationships among added/existing cases. Upon completion of the processing in Step S304, the series of processing are completed.

Next, operations in the case of executing reconfiguration processing with the AI manual system 100 will be explained.

Figure 10:
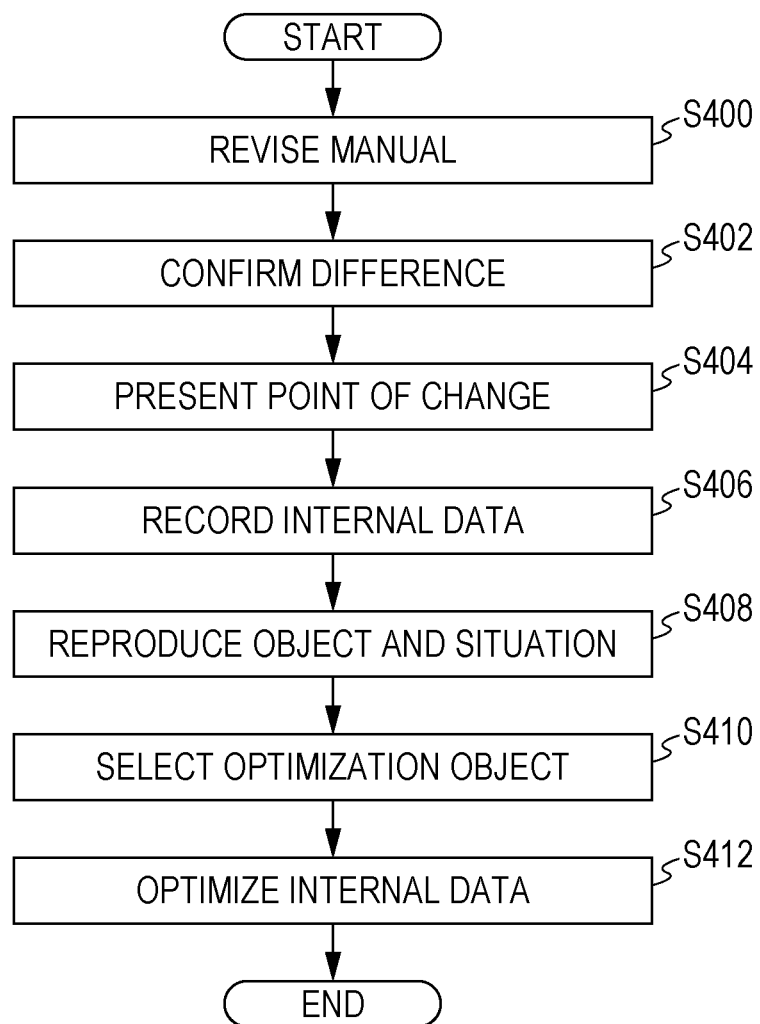
FIG. 10 is a flow chart illustrating reconfiguration processing.

FIG. 10 is a flow chart illustrating reconfiguration processing.

The CPU 30 activates a prescribed program (reconfiguration module) stored in the storage device 42, and executes the proficiency processing illustrated in the flow chart of FIG. 10 according to that program.

The proficiency processing is processing to be executed when reconfiguring the AI engine. When the proficiency processing is executed in the CPU 30, firstly, a shift is made to Step S400 as illustrated in FIG. 10.

In Step S400, the manual is revised as data in the form of a manual that is readable by humans and that is re-capturable, based on the optimized internal data (rule). Then, a shift is made to Step S402 in which the operator or the like is allowed to confirm inclusion of new elements and presence of differences based on the revised manual, and a shift is made to Step S404.

In Step S404, relevant constituting units or points of changes are displayed on the display device 44 as insufficient parts, based on a confirmation result in Step S402. Then, a shift is made to Step S406 in which internal data (rule) is recorded based on a work result concerning the insufficient parts, and a shift is made to Step S408.

In Step S408, the work object and the work situation that have changed due to the act of the worker are virtually reproduced according to the recorded internal data (rule). Then, a shift is made to Step S410 in which differences from the highest evaluation for respective points of the reproduced changes are displayed on the display device 44, and the operator or the like is allowed to select, for each of constituting units or each of the points of changes concerning the insufficient parts, whether to set this as an optimization object, and a shift is made to Step S412.

In Step S412, the internal data (rule) is optimized with the selected optimization object. Specifically, machine learning and optimization learning are performed with input of a model case of a part concerned or internally generated data that is equivalent to such a case. Upon completion of the processing in Step S304, the series of processing are completed.

Next, effects of the present embodiment will be explained.

In the present embodiment, the rule describing the determination condition of the work object or the work situation is generated based on the manual, and the sensor information is acquired from the device 300. Based on the acquired sensor information, the work object and the work situation are recognized, and the work support information is transmitted to the device 300 based on the rule and the recognition result.

In this manner, the rule is generated based on the manual, and the work support information is notified based on the rule and the recognition result of the work object and the work situation. Thus, for example, if an existing manual such as a maintenance manual is given, the work support information in accordance with the work object and the work situation can be provided to the worker. Accordingly, since there is no need to define work contents and create work procedures one by one, it is possible to easily deal with a wide variety of work as compared to conventional techniques.

Furthermore, in the present embodiment, the terms are extracted from the manual based on the term table to generate the rule describing the determination condition having the extracted terms as the elements, and the work object and the work situation that are associated with the terms, which are the elements of the determination condition, are recognized.

In this manner, since the generation of the rule, the recognition of the work object and the work situation, and the application to the rule are performed while having the terms as the elements, it is possible to improve conformity to the rule.

Furthermore, in the present embodiment, the rule is generated by associating elements that are terms, headings, texts, items, charts, figures, images, videos, or others included in the manual, and changes in the elements using the model case are recorded. Based on this recording result, the internal data (rule) is optimized such that the model case gains the highest evaluation.

In this manner, since the rule is optimized such that the model case gains the highest evaluation, it is possible to improve conformity to the rule.

Furthermore, in the present embodiment, when it is determined that the recognized work object or work situation satisfies the determination condition of the rule, the work support information is transmitted to the device 300, and changes in the internal data (rule) are recorded. Based on this recording result, evaluation information on a work result is generated using differences as compared to the optimized internal data (rule).

In this manner, the evaluation information that uses the model case as the standard can be obtained.

Furthermore, in the present embodiment, the work object and the work situation that have changed due to the act of the worker are virtually reproduced according to the internal data (rule), and the differences from the highest evaluation for respective points of the reproduced changes are presented. For each of the constituting units or each of the points of changes, whether to set this as the optimization object is selected, and the internal data (rule) is optimized with the selected optimization object.

In this manner, since the rule is optimized in accordance with the actual work content of the worker, it is possible to improve conformity to the rule.

Furthermore, in the present embodiment, the manual is revised based on the optimized internal data (rule), and the inclusion of new elements and the presence of differences are confirmed based on the revised manual. Based on this confirmation result, relevant constituting units or points of changes are presented as insufficient parts, and the internal data (rule) is recorded based on the work result concerning the insufficient parts. The work object and the work situation that have changed due to the act of the worker are virtually reproduced according to the recorded internal data (rule), and the differences from the highest evaluation for respective points of the reproduced changes are presented. For each of the constituting units or the points of changes concerning the insufficient parts, whether to set this as the optimization object is selected, and the internal data (rule) is optimized with the selected optimization object.

In this manner, since the insufficient parts are analyzed based on the revised manual, and the rule is optimized based on this analysis result, it is possible to improve conformity to the rule.

In the present embodiment, the notification section 52 corresponds to the notification means of Invention 1, 4 or 7; Step S104 corresponds to the rule generation means of Invention 1, 2, 3 or 5, or the rule generation step of Invention 7; and Step S108 corresponds to the element change recording means of Invention 3. In addition, Step S110 corresponds to the learning means of Invention 3, 4, or 6; Steps S202 and S224 correspond to the sensor information acquisition means of Invention 1, or the sensor information acquisition step of Invention 7; and Step S206 corresponds to the recognition means of Invention 1, 2, or 4, or the recognition step of Invention 7.

In addition, in the present embodiment, Steps S208 and S210 correspond to the work support information output means of Invention 1 or 4, or the work support information output step of Invention 7; Step S212 corresponds to the rule change recording means of Invention 4; and Step S216 corresponds to the evaluation information generation means of Invention 4. Furthermore, Step S300 corresponds to the virtuality reproduction means of Invention 5; Step S302 corresponds to the optimization object selection means of Invention 5; Step S304 corresponds to the second learning means of Invention 5 or 6; and Step S400 corresponds to the manual revision means of Invention 6.

In addition, in the present embodiment, Step S402 corresponds to the new element confirmation means of Invention 6; Step S404 corresponds to the relevant element presenting means of Invention 6; Step S406 corresponds to the rule recording means of Invention 6; and Step S408 corresponds to the second virtuality reproduction means of Invention 6. Furthermore, Step S410 corresponds to the second optimization object selection means of Invention 6; and Step S412 corresponds to the third learning means of Invention 6.

[Modification Example] It should be noted that although the processing in Step S400 was configured to revise the manual in the above-described embodiment, not limited thereto, the processing can also be configured to generate a new manual.

In addition, although a case in which the device 300 falls into an environment that is incapable of communicating with the Internet 199 was not particularly explained in the above-described embodiment or its modification example, it is also possible to configure the device 300 such that it automatically operates when falling into an environment incapable of communication.

Although the processing in Step S400 was configured so as to revise the manual, not limited thereto, it is also possible to configure the processing so as to generate a new manual.

In addition, the above-described embodiment and its modification example explained cases in which the program stored in the storage device 42 in advance is executed when executing the processing illustrated in the flow charts of FIG. 6, FIG. 8, FIG. 9, and FIG. 10. However, not limited thereto, the RAM 34 may read a program indicating those procedures from a storage medium storing that program, and execute the program.

In addition, in the above-described embodiment and its modification example, the present invention was applied to cases in which a worker performs maintenance of equipment, facilities, and the like. However, not limited thereto, the present invention can also be applied to other cases without departing from the scope of the present invention. For example, the present invention can also be applied to the cases of performing assembly work, clerical work, and other kinds of work.

DESCRIPTION OF REFERENCE CHARACTERS

100 AI manual system
200 management system
300 device
30 CPU
32 ROM
34 RAM
38 I/F
39 bus
40 input device
42 storage device
44 display device
50 sensor
52 notification section
54 communication section
56 control section
199 Internet

The invention claimed is:
1. A work support system that is communicably connected to a device having a sensor and a notification means that is worn or carried by a worker, for supporting work of the worker, the work support system comprising:
a rule generation means that generates a rule describing a determination condition of a work object or work situation by, based on a manual describing procedures, contents, points of attention, or other matters of the work, associating elements that are terms, headings, texts, items, charts, figures, images, videos, or others included in the manual;
an element change recording means that records changes in the elements using a model case;
a learning means that optimizes the rule such that the model case gains the highest evaluation based on a recording result of the element change recording means;
a sensor information acquisition means that acquires sensor information of the sensor;
a recognition means that recognizes the work object and the work situation based on the sensor information acquired by the sensor information acquisition means; and
a work support information output means that outputs work support information to the notification means based on the rule generated by the rule generation means and a recognition result of the recognition means.

2. The work support system of claim 1, wherein
the rule generation means extracts terms from the manual based on a term table in which terms are registered and generates a rule describing the determination condition having the extracted terms as elements, and
the recognition means recognizes the work object and the work situation that are associated with the terms that are the elements in the determination condition.

3. The work support system of either claim 1 or 2, wherein
the work support information output means outputs the work support information to the notification means when the work object or the work situation recognized by the recognition means is determined to satisfy the determination condition of the rule, and wherein
the work support system comprises: a rule change recording means that records changes in the rule; and
an evaluation information generation means that generates evaluation information on a work result using differences as compared to the rule optimized by the learning means, based on a recording result of the rule change recording means.

4. The work support system of claim 1, comprising:
a virtuality reproduction means that virtually reproduces the work object and the work situation that have changed due to an act of the worker according to the rule generated by the rule generation means;
an optimization object selection means that presents differences from the highest evaluation for respective points of the changes reproduced by the virtuality reproduction means, and selects, for each of constituting units or each of the points of changes, whether to set this as an optimization object; and
a second learning means that optimizes the rule with the optimization object selected by the optimization object selection means.

5. The work support system of claim 4, comprising:
a manual revision means that generates or revises the manual based on the rule optimized by the learning means or the second learning means;
a new element confirmation means that confirms inclusion of the elements that are new and presence of differences, based on the manual generated or revised by the manual revision means;
a relevant element presenting means that presents relevant constituting units or points of changes as insufficient parts, based on a confirmation result of the new element confirmation means;
a rule recording means that records the rule based on a work result concerning the insufficient parts;
a second virtuality reproduction means that virtually reproduces the work object and the work situation that have changed due to an act of the worker according to the rule recorded by the rule recording means;
a second optimization object selection means that presents differences from the highest evaluation for respective points of the changes reproduced by the second virtuality reproduction means, and selects, for each of the constituting units or each of the points of changes concerning the insufficient parts, whether to set this as an optimization object; and
a third learning means that optimizes the rule with the optimization object selected by the second optimization object selection means.

6. A work support program to be executed by a computer that is communicably connected to a device having a sensor and a notification means that is worn or carried by a worker, for supporting work of the worker, wherein the work support program is a program for allowing the computer to execute processing comprising:
a rule generation step that generates a rule describing a determination condition of a work object or work situation by, based on a manual describing procedures, contents, points of attention, or other matters of the work, associating elements that are terms, headings, texts, items, charts, figures, images, videos, or others included in the manual;
an element change recording step that records changes in the elements using a model case;
a learning step that optimizes the rule such that the model case gains the highest evaluation based on a recording result in the element change recording step;
a sensor information acquisition step that acquires sensor information of the sensor;
a recognition step that recognizes the work object and the work situation based on the sensor information acquired in the sensor information acquisition step; and
a work support information output step that outputs work support information to the notification means based on the rule generated in the rule generation step and a recognition result in the recognition step.

* * * * *